(12) United States Patent
Ikeda et al.

(10) Patent No.: US 9,950,748 B2
(45) Date of Patent: Apr. 24, 2018

(54) HETEROGENEOUS MATERIAL JOINT STRUCTURE

(71) Applicant: TOYOTA JIDOSHA KABUSHIKI KAISHA, Toyota-shi, Aichi (JP)

(72) Inventors: Koki Ikeda, Toyota (JP); Kiyoshi Hokazono, Toyota (JP); Shinya Kamimura, Toyota (JP); Kentaro Nakamura, Toyota (JP); Shin Terada, Toyota (JP); Tomohiro Sakurai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 15/104,772

(22) PCT Filed: Dec. 10, 2014

(86) PCT No.: PCT/JP2014/082758
§ 371 (c)(1),
(2) Date: Jun. 15, 2016

(87) PCT Pub. No.: WO2015/098538
PCT Pub. Date: Jul. 2, 2015

(65) Prior Publication Data
US 2016/0318556 A1 Nov. 3, 2016

(30) Foreign Application Priority Data

Dec. 25, 2013 (JP) .................................. 2013-267963

(51) Int. Cl.
*B60K 1/04* (2006.01)
*B62D 29/00* (2006.01)
(Continued)

(52) U.S. Cl.
CPC .............. *B62D 29/005* (2013.01); *B60K 1/04* (2013.01); *B62D 25/20* (2013.01); *B62D 27/023* (2013.01);
(Continued)

(58) Field of Classification Search
CPC .............. B60K 1/04; B60K 2001/0405; B60K 2001/0411; B60K 2001/0416;
(Continued)

(56) References Cited

U.S. PATENT DOCUMENTS 8,746,782 B2 * 6/2014 Naoi ...................... B62D 25/10
180/69.1
9,511,680 B2 * 12/2016 Hokazono ........... B60L 11/1877
(Continued)

FOREIGN PATENT DOCUMENTS

CN 103153761 A 6/2013
EP 0794107 A1 9/1997
(Continued)

OTHER PUBLICATIONS

Mar. 1, 2017 Office Action issued in Chinese Patent Application No. 201480070437.0.

*Primary Examiner* — Jacob B Meyer
(74) *Attorney, Agent, or Firm* — Oliff PLC

(57) ABSTRACT

In a battery frame, an upper panel is made of carbon fiber reinforced plastic, and first reinforcements are made of sheet metal. Head portions of rivets are disposed at the upper panel side, and a diameter dimension of the head portions is set larger than that of caulking portions of the rivets. This enables a contact surface area between the rivets and the upper panel to be larger than in cases in which the caulking portions are disposed at the upper panel side. This enables peripheral edge portions of first joint holes in the upper panel to be supported by the head portions of the rivets over a large (Continued)

surface area. The peripheral edge portions of the first joint holes in the upper panel are thereby suppressed from breaking and the like.

5 Claims, 5 Drawing Sheets

(51) Int. Cl.
*B62D 25/20* (2006.01)
*F16B 5/04* (2006.01)
*B62D 27/02* (2006.01)
*F16B 19/06* (2006.01)

(52) U.S. Cl.
CPC ........ *F16B 5/04* (2013.01); *B60K 2001/0438* (2013.01); *F16B 19/06* (2013.01)

(58) Field of Classification Search
CPC .... B60K 2001/0422; B60K 2001/0427; B60K 2001/0433; B60K 2001/0438; B62D 25/20; B62D 25/2009; B62D 25/2018; B62D 25/2027; B62D 25/2072; B62D 27/023; F16B 5/04; F16B 19/06
See application file for complete search history.

(56) References Cited

U.S. PATENT DOCUMENTS

| 2008/0196957 | A1 | 8/2008 | Koike et al. | |
|---|---|---|---|---|
| 2013/0181476 | A1* | 7/2013 | Naoi | B62D 25/10 296/180.1 |
| 2015/0343971 | A1* | 12/2015 | Ikeda | B60K 1/04 429/100 |

FOREIGN PATENT DOCUMENTS

| EP | 2623401 A1 | 8/2013 |
|---|---|---|
| EP | 2671777 A1 | 12/2013 |
| JP | 2005-007949 A | 1/2005 |
| JP | 2007-071260 A | 3/2007 |
| JP | 2007-231999 A | 9/2007 |
| JP | 2013-028191 A | 2/2013 |
| WO | 2012/043268 A1 | 4/2012 |

* cited by examiner

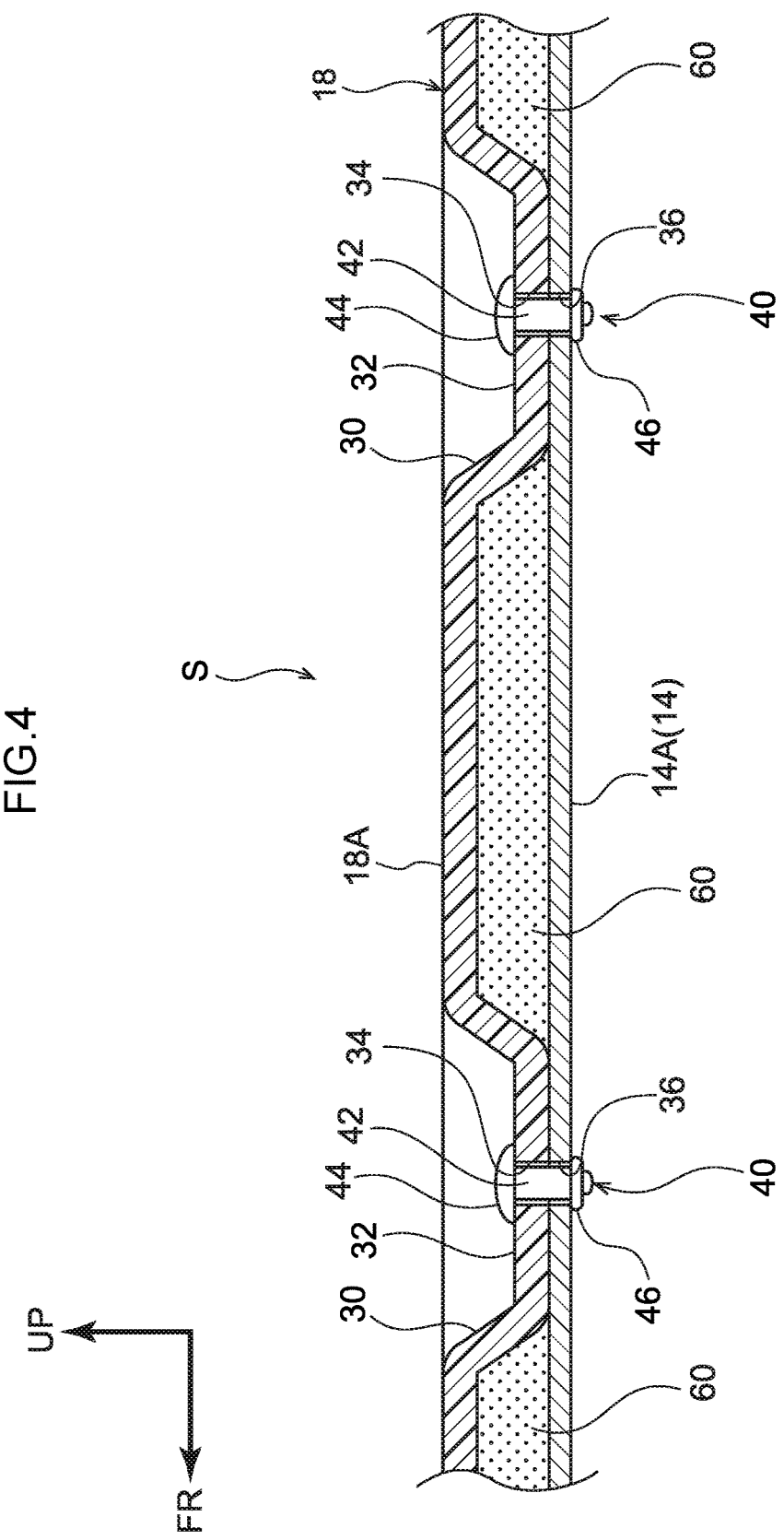

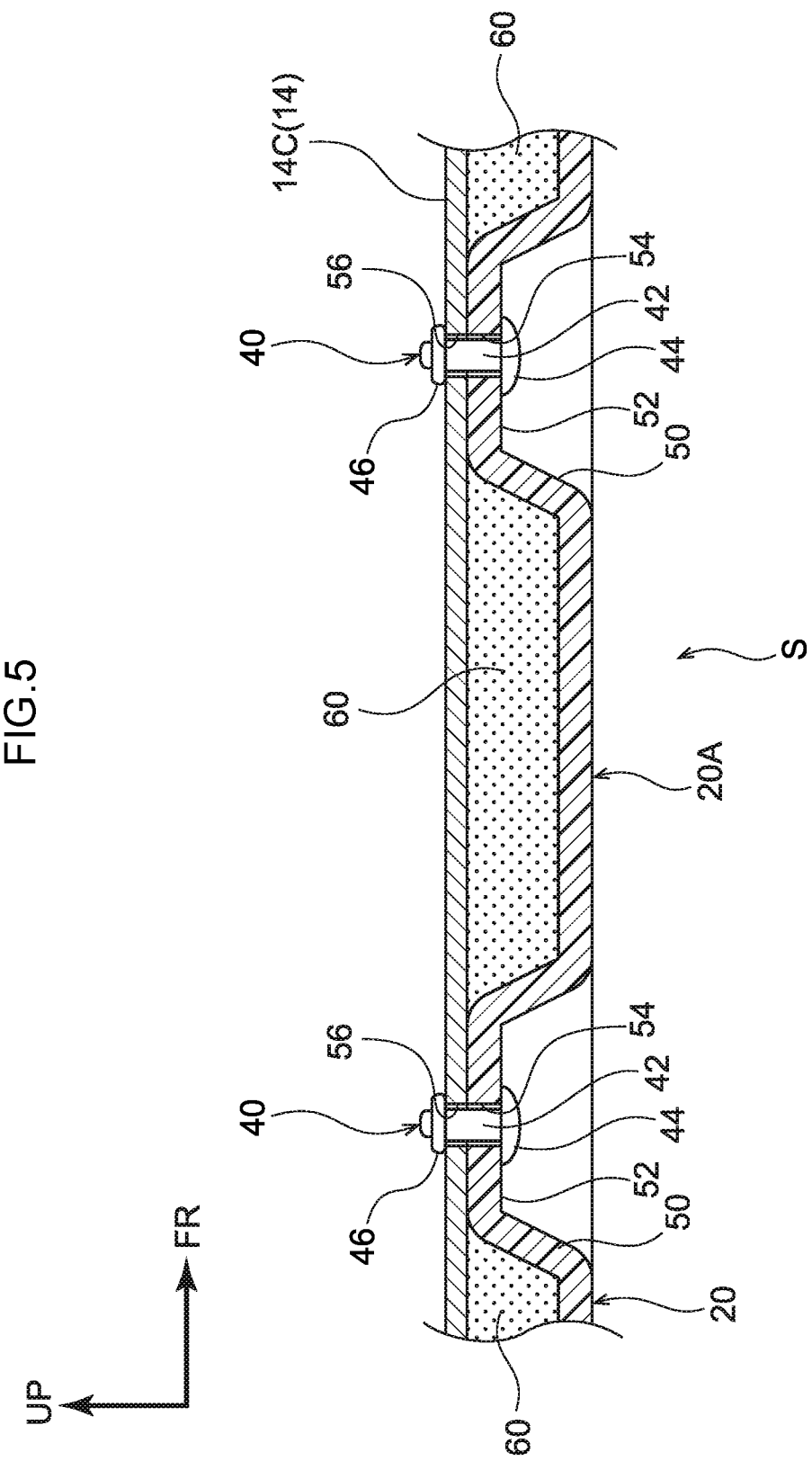

HETEROGENEOUS MATERIAL JOINT STRUCTURE

TECHNICAL FIELD

The present invention relates to a heterogeneous material joint structure, and particularly relates to a joint structure in which a member made of fiber reinforced plastic and a member made of metal are joined together by rivets.

BACKGROUND ART

Patent Document 1 describes a structure in which an outer panel made of fiber reinforced plastic and an inner panel made of metal are joined together by rivets.

RELATED DOCUMENTS

Related Patent Documents

Patent Document 1: Japanese Patent Application Laid-Open (JP-A) No. 2005-7974
Patent Document 2: JP-A No. 2007-71260

SUMMARY OF INVENTION

Technical Problem

However, the strength at peripheral edge portions of holes in the outer panel into which the rivets are inserted tends to be lower than at other portions of the outer panel. Thus, in a case in which load has acted in a direction to separate the outer panel and the inner panel, for example, there is a possibility that the peripheral edge portions of the holes in the outer panel may break.

In consideration of the above circumstances, an object of the present invention is to provide a heterogeneous material joint structure capable of securing the joint strength of a resin panel made of fiber reinforced plastic that is joined by rivets to a metal panel made of metal.

Solution to Problem

A heterogeneous material joint structure according to a first aspect includes a resin panel that is configured by a fiber reinforced plastic and that is formed with a first hole, a metal panel that is configured by a metal and that is formed with a second hole at a location facing the first hole, and a rivet. The rivet is inserted into the first hole and into the second hole, joins the resin panel and the metal panel together in a state in which a head portion configuring one end portion of the rivet is disposed at the resin panel side and a flange portion configuring another end portion of the rivet is disposed at the metal panel side, and a diameter dimension of the head portion is set larger than a diameter dimension of the flange portion.

In the heterogeneous material joint structure according to the first aspect, the first hole is formed in the resin panel configured by fiber reinforced plastic. The second hole is formed in the metal panel configured by metal at a location facing to the first hole. The rivet is inserted into the first hole and into the second hole, and the resin panel and the metal panel are joined together by the rivet.

However, in the resin panel, the strength of a peripheral edge portion of the first hole tends to be relatively low.

Note that the head portion configuring the one end portion of the rivet is disposed at the resin panel side, the flange portion configuring the other end portion of the rivet is disposed at the metal panel side, and the diameter dimension of the head portion is set larger than the diameter dimension of the flange portion. Namely, a contact surface area between the head portion of the rivet and the resin panel is greater than a contact surface area between the flange portion of the rivet and the metal panel. This enables the contact surface area between the rivet and the resin panel to be larger than in cases in which the flange portion is disposed at the resin panel side. Thus, if load in a direction to separate the resin panel and metal panel has acted on the resin panel, for example, the peripheral edge portion of the first hole in the resin panel can be supported over a large surface area by the head portion of the rivet. The peripheral edge portion of the first hole of the resin panel is thereby suppressed from breaking and the like.

A heterogeneous material joint structure according to a second aspect is the heterogeneous material joint structure according to the first aspect, wherein a recessed portion that projects out from a general portion of the resin panel toward the metal panel side and abuts the metal panel is formed in the resin panel, and the first hole is formed in the recessed portion.

In the heterogeneous material joint structure according to the second aspect, the recessed portion including the first hole is formed in the resin panel, and the recessed portion projects out toward the metal panel side from the general portion of the resin panel and abuts the metal panel. The joining force of the rivet is thereby borne by the recessed portion and the metal panel, thereby enabling a distance between the general portion of the resin panel and the metal panel to be suppressed from changing.

A heterogeneous material joint structure according to a third aspect is the heterogeneous material joint structure according to the second aspect, wherein the resin panel and the metal panel configure a frame that is disposed under a floor of a vehicle and that supports a vehicle installed component installed to the vehicle, in the frame, the resin panel is disposed facing a vehicle lower side of the metal panel, and the head portion is disposed further toward a vehicle upper side than the general portion.

In the heterogeneous material joint structure according to the third aspect, the resin panel and the metal panel configure the frame. The frame is disposed under the floor of the vehicle and supports the vehicle installed component. In the frame, the resin panel is disposed facing the vehicle lower side of the metal panel, and the head portion of the rivet is disposed further toward the vehicle upper side than the general portion of the resin panel. Thus, if an obstacle has approached the frame from the lower side of the vehicle, for example, the obstacle is suppressed from striking the rivet due to the obstacle striking the general portion of the resin panel. This enables performance to protect the rivet that joins the resin panel and the metal panel together to be improved.

A heterogeneous material joint structure according to a fourth aspect is the heterogeneous material joint structure according to any one of the first aspect to the third aspect, wherein the first hole is machined after molding the resin panel.

The heterogeneous material joint structure according to the fourth aspect enables the joint strength of the resin panel to be secured, even in cases in which the first hole, through which the rivet is inserted, has been machined after molding the resin panel.

Advantageous Effects of Invention

The heterogeneous material joint structure according to the first aspect enables the joint strength to be secured of the resin panel made of fiber reinforced plastic that has been joined by rivet to the metal panel made of metal.

The heterogeneous material joint structure according to the second aspect enables the distance between the general portion of the resin panel and the metal panel to be suppressed from changing.

The heterogeneous material joint structure according to the third aspect enables the performance to protect the rivet to be improved.

The heterogeneous material joint structure according to the fourth aspect enables the joint strength of the resin panel to be secured, even in cases in which the first hole, through which the rivet is inserted, has been machined after molding the resin panel.

BRIEF DESCRIPTION OF DRAWINGS

FIG. 4 is an enlarged cross-section (sectioned along line 4-4 in FIG. 3) illustrating a joint state of an apex wall of the first reinforcement to the upper panel illustrated in FIG. 3, as viewed from the vehicle left side.

FIG. 5 is an enlarged cross-section (sectioned along line 5-5 in FIG. 3) illustrating a joint state of a flange of the first reinforcement to the lower panel illustrated in FIG. 3, as viewed from the vehicle right side.

DESCRIPTION OF EMBODIMENTS

Figure 2:
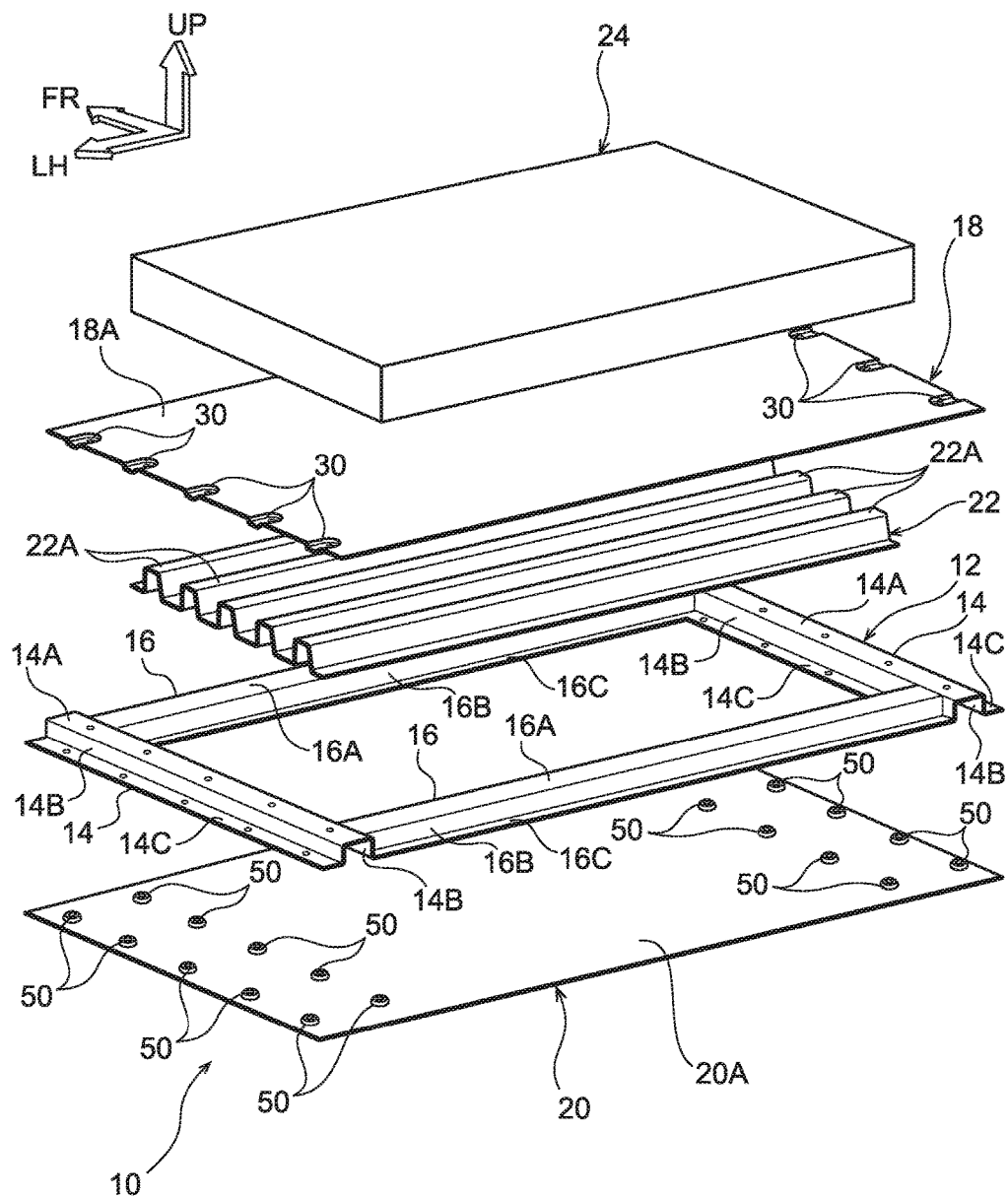
FIG. 2 is an exploded perspective view illustrating the entire battery frame illustrated in FIG. 1, as viewed diagonally from the rear left of the vehicle.

FIG. 2 is an exploded perspective view illustrating a battery frame (stack frame) 10 serving as a "frame" applied with a heterogeneous material joint structure S according to an exemplary embodiment. The battery frame 10 is disposed at the vehicle lower side of a floor panel of a vehicle (automobile), not illustrated in the drawings. Namely, the battery frame 10 is disposed under the floor of the vehicle, and configures a lower section of the vehicle. A fuel cell stack 24 (an element broadly understood to be a "battery"), serving as a "vehicle installed component", is disposed between the floor panel and the battery frame 10. The battery frame 10 supports the fuel cell stack 24 from the vehicle lower side. Note that in the drawings, the arrow UP indicates the vehicle upper side, the arrow LH indicates the vehicle left side (one vehicle width direction side), and the arrow FR indicates the vehicle front side of a vehicle installed with the battery frame 10.

The battery frame 10 includes a battery frame reinforcement (hereafter referred to as "battery frame RF") 12 configuring a frame member of the battery frame 10. An upper panel 18, serving as a "resin panel", is disposed at the vehicle upper side of the battery frame RF 12, and a lower panel 20, serving as a "resin panel" is disposed at the vehicle lower side of the battery frame RF 12. A core member 22 is disposed between the upper panel 18 and the lower panel 20. Explanation follows regarding the configuration of each member, and then explanation regarding the heterogeneous material joint structure S.

The battery frame RF 12 is formed in a substantially rectangular frame shape in plan view. The battery frame RF 12 is configured including a pair of first reinforcements 14, each serving as a "metal panels" configuring either vehicle width direction end portion of the battery frame RF 12, and a pair of second reinforcements 16, each serving as "metal panel" respectively configuring a vehicle front end portion and a vehicle rear end portion of the battery frame RF 12.

Figure 1:
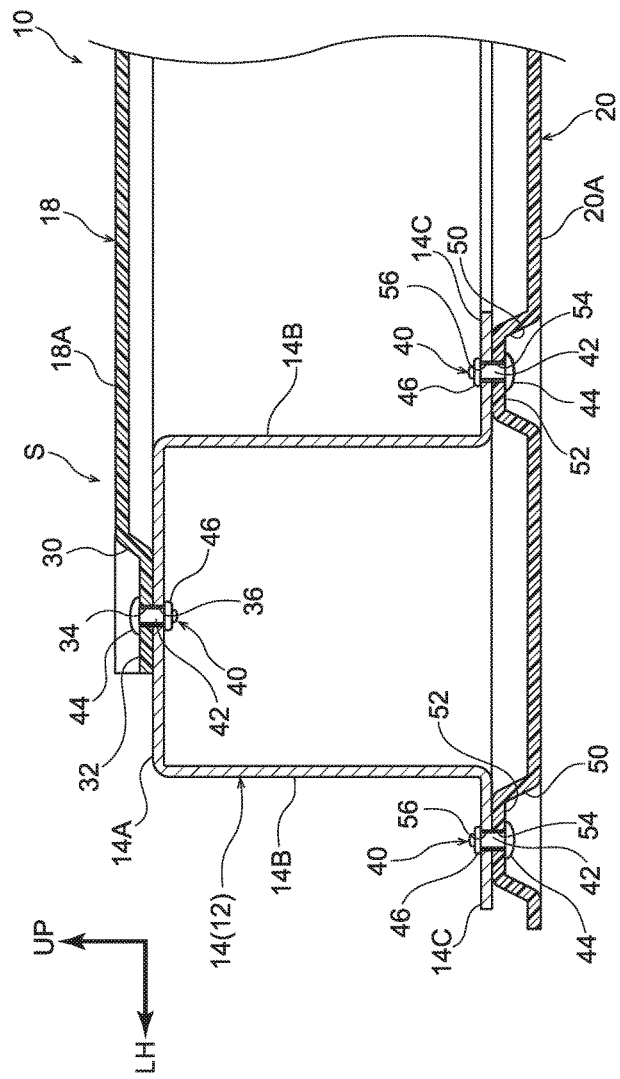
FIG. 1 is an enlarged cross-section (sectioned along line 1-1 in FIG. 3) illustrating relevant portions of a battery frame applied with a heterogeneous material joint structure according to an exemplary embodiment, as viewed from the vehicle rear side.

The first reinforcements 14 are made of metal (sheet steel in the present exemplary embodiment). The first reinforcements 14 extend along the vehicle front-rear direction, and are each formed in substantially a hat shape open toward the vehicle lower side as viewed from their length direction. Specifically, as is also illustrated in FIG. 1, each first reinforcement 14 is configured including an apex wall 14A with its sheet thickness direction along the vehicle vertical direction, a pair of side walls 14B respectively extending out toward the vehicle lower side from either width direction end of the apex wall 14A, and a pair of flanges 14C respectively extending out from lower ends of the side walls 14B toward the width direction outsides of the first reinforcement 14.

As illustrated in FIG. 2, the second reinforcements 16 are made of metal (sheet steel in the present exemplary embodiment), similarly to the first reinforcements 14. The second reinforcements 16 extend along the vehicle width direction between the pair of first reinforcements 14, and are each formed in substantially a hat shape open toward the vehicle lower side as viewed from their length direction. Specifically, each second reinforcement 16 is configured including an apex wall 16A with its sheet thickness direction along the vehicle vertical direction, a front wall (not illustrated in the drawings) and a rear wall 16B respectively extending out toward the vehicle lower side from a front end and a rear end of the apex wall 16A, and flanges 16C respectively extending out from lower ends of the front wall and the rear wall 16B toward the width direction outsides of the second reinforcement 16 (namely, the vehicle front-rear direction). Both vehicle width direction end portions of the second reinforcements 16 are joined by a means such as welding to the first reinforcements 14.

The upper panel 18 is made of fiber reinforced plastic (FRP) (carbon fiber reinforced plastic (CFRP) in the present exemplary embodiment), and is formed in a substantially rectangular sheet shape. The upper panel 18 is disposed at the vehicle upper side of the battery frame RF 12 with its sheet thickness direction along the vehicle vertical direction, and is joined to the battery frame RF 12 by the heterogeneous material joint structure S, described later.

The lower panel 20 is made of fiber reinforced plastic (FRP) (carbon fiber reinforced plastic (CFRP) in the present exemplary embodiment) similarly to the upper panel 18, and is formed in a substantially rectangular sheet shape. The lower panel 20 is disposed at the vehicle lower side of the battery frame RF 12 with its sheet thickness direction along the vehicle vertical direction, and is joined to the battery frame RF 12 by the heterogeneous material joint structure S, described later.

The core member 22 is made of fiber reinforced plastic (FRP) (carbon fiber reinforced plastic (CFRP) in the present exemplary embodiment) similarly to the upper panel 18, and is disposed inside the battery frame RF 12. The core member 22 is configured including plural protruding portions 22A, each formed with a substantially hat shaped cross-section extending along the vehicle width direction, and the protruding portions 22A are integrally formed in a row in the vehicle front-rear direction. An upper face of the core member 22 is joined by adhesive to a lower face of the upper panel 18, and a lower face of the core member 22 is joined by adhesive to an upper face of the lower panel 20.

Explanation follows regarding the heterogeneous material joint structure S, this being a relevant portion of the present invention. The heterogeneous material joint structure S is applied at joining the upper panel 18 and the lower panel 20 to the battery frame RF 12. Joining the upper panel 18 and the lower panel 20 to the first reinforcements 14, and joining the upper panel 18 and the lower panel 20 to the second reinforcements 16, are similarly configured. Explanation accordingly follows regarding joining the upper panel 18 and the lower panel 20 to the first reinforcements 14, whereas explanation regarding joining the upper panel 18 and the lower panel 20 to the second reinforcements 16 is omitted.

Joining Upper Panel 18 to First Reinforcements 14

Figure 3:
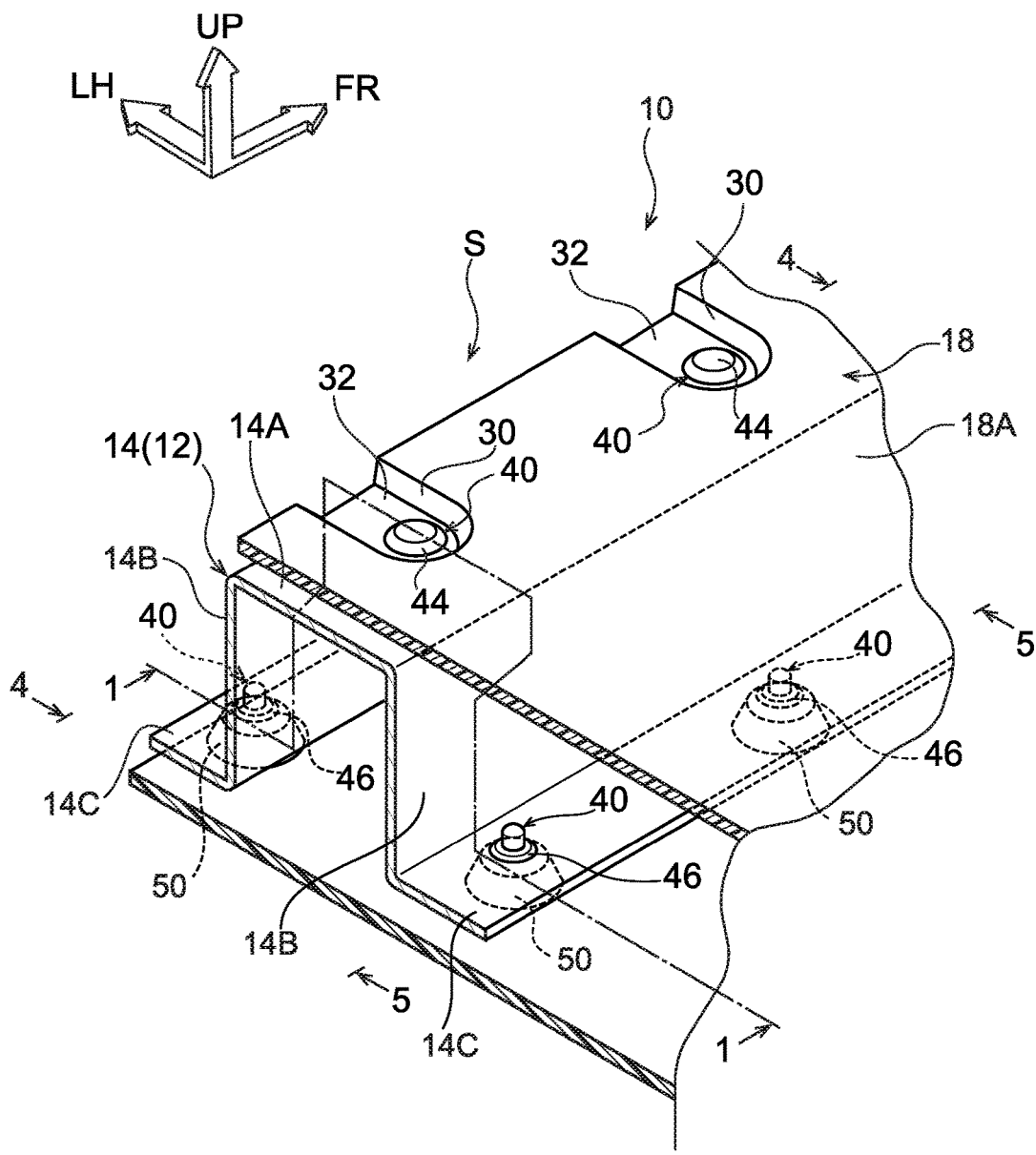
FIG. 3 is an enlarged perspective view illustrating relevant portions of the battery frame illustrated in FIG. 1, as viewed diagonally from the rear right of the vehicle.

As illustrated in FIG. 1, FIG. 3, and FIG. 4, plural upper side recessed portions 30, serving as "recessed portions", are formed at the upper panel 18 at portions facing the apex walls 14A of the first reinforcements 14 in the vehicle vertical direction. The upper side recessed portions 30 are disposed in rows in the vehicle front-rear direction. The upper side recessed portions 30 are each formed with a substantially U-shaped cross-section projecting out toward the vehicle lower side (namely, the first reinforcement 14 side), and are each open toward the vehicle width direction outside in plan view. A seat portion 32 with a head portion 44 of a rivet 40, described later, placed thereon is configured at a bottom wall of each upper side recessed portion 30. The seat portions 32 are disposed parallel to the apex walls 14A of the first reinforcements 14, and a lower face of the seat portion 32 abuts an upper face of the respective apex wall 14A. The seat portions 32 of the upper side recessed portions 30 and the apex walls 14A of the first reinforcements 14 are thereby disposed overlapping each other in the vehicle vertical direction. A general portion 18A of the upper panel 18 (a portion excluding the upper side recessed portions 30) is disposed parallel to the apex walls 14A in a state separated from the apex walls 14A of the first reinforcements 14 and at the vehicle upper side thereof.

As illustrated in FIG. 1 and FIG. 4, a first joint hole 34, serving as a circular shaped "first hole" is formed piercing through the seat portion 32 of each upper side recessed portion 30. The first joint holes 34 are formed by post-processing after molding the upper panel 18. Second joint holes 36, serving as circular shaped "second holes" are formed in the apex walls 14A of the first reinforcements 14, and the second joint holes 36 are disposed coaxially to the respective first joint holes 34. Namely, the first joint holes 34 and the respective second joint holes 36 are placed in communication with each other.

The upper panel 18 is joined to the apex walls 14A of the first reinforcements 14 at the locations of the upper side recessed portions 30 by the rivets 40. The rivets 40 are configured as blind rivets. Specifically, each rivet 40 is configured including a shaft portion 42 that is inserted into the first joint hole 34 and the respective second joint hole 36, the head portion 44 configuring one axial direction end portion of the rivet 40, and a caulking portion 46, serving as a "flange portion" configuring another axial direction end portion of the rivet 40. In a state in which the head portion 44 of each rivet 40 has been placed on the seat portion 32 of the upper side recessed portion 30, the caulking portion 46 of the rivet 40 is caulked at the vehicle lower side of the apex wall 14A, and the upper panel 18 and the first reinforcements 14 are joined together by the rivets 40. A diameter dimension of the head portion 44 of the rivet 40 is set larger than a diameter dimension of the shaft portion 42 and also a diameter dimension of the caulking portion 46. The height of the head portion 44 of the rivet 40 is set lower than a projection height of the upper side recessed portion 30, such that the head portion 44 of the rivet 44 is disposed further toward the vehicle lower side than the upper face of the general portion 18A of the upper panel 18.

Adhesive 60 (see FIG. 4) is interposed between the general portion 18A of the upper panel 18 and the apex wall 14A of each first reinforcement 14, and both members are joined together by the adhesive 60.

Joining Lower Panel 20 to First Reinforcements 14

As illustrated in FIG. 1 and FIG. 3, the lower panel 20 is joined to the pair of flanges 14C of each first reinforcement 14. The lower panel 20 is joined to each of the pair of flanges 14C with a similar configuration. Explanation accordingly follows regarding joining one flange 14C to the lower panel 20, whereas explanation regarding joining the other flange 14C to the lower panel 20 is omitted.

Plural lower side recessed portions 50, serving as "recessed portions", are formed at the lower panel 20 at portions facing the respective flange 14C of the first reinforcement 14 in the vehicle vertical direction. The lower side recessed portions 50 are disposed in a row in the vehicle front-rear direction. Each lower side recessed portion 50 is formed with a substantially U-shaped cross-section projecting out toward the vehicle upper side (namely, the first reinforcement 14 side), and is formed in a substantially circular shape in plan view. A seat portion 52 is configured at a bottom wall of each lower side recessed portion 50. The seat portion 52 is disposed parallel to the respective flange 14C of the first reinforcement 14, and an upper face of the seat portion 52 abuts a lower face of the flange 14C. The seat portions 52 of the lower side recessed portions 50 and the flange 14C of the first reinforcement 14 are thereby disposed overlapping each other in the vehicle vertical direction. A general portion 20A of the lower panel 20 (a portion excluding the lower side recessed portions 50) is disposed parallel to the flange 14C of the first reinforcement 14 in a state separated from the flange 14C and at the vehicle lower side thereof.

As illustrated in FIG. 1 and FIG. 5, a first joint hole 54, serving as a circular shaped "first hole" is formed piercing through the seat portion 52 of each lower side recessed portion 50. The first joint holes 54 are formed by post-processing after molding the lower panel 20. Second joint holes 56, serving as circular shaped "second holes" are formed in the respective flange 14C of the first reinforcement 14, and the second joint holes 56 are disposed coaxially to the first joint holes 54. Namely, the first joint holes 54 and the respective second joint holes 56 are placed in communication with each other.

The lower panel 20 is joined to the respective flange 14C of the first reinforcement 14 at the locations of the lower side recessed portions 50 by rivets 40. Specifically, in a state in which a shaft portion 42 of each rivet 40 is inserted into the respective first joint hole 54 and into the respective second joint hole 56 and a head portion 44 of the rivet 40 has been placed on the seat portion 52, a caulking portion 46 is caulked at the vehicle upper side of the flange 14C. The height of the head portion 44 of the rivet 40 is set lower than a projection height of the lower side recessed portion 50, such that the head portion 44 of the rivet 40 is disposed further toward the vehicle upper side than a lower face of the general portion 20A of the lower panel 20.

Similarly to the upper panel 18, adhesive 60 (see FIG. 5) is interposed between the general portion 20A of the lower panel 20 and the flange 14C of each first reinforcement 14, and both members are joined together by the adhesive 60.

Explanation follows regarding operation and advantageous effects of the present exemplary embodiment.

In the battery frame 10 configured as described above, the upper panel 18 and the lower panel 20 are configured by carbon fiber reinforced plastic (CFRP), and the battery frame 10 (the first reinforcements 14 and the second reinforcements 16) is configured by metal (sheet steel). The upper side recessed portions 30 (lower side recessed portions 50) are formed at the upper panel 18 (lower panel 20), and the seat portions 32 of the upper side recessed portions 30 (seat portions 52 of the lower side recessed portions 50) are disposed overlapping with the apex walls 14A (flanges 14C) of the first reinforcements 14.

The rivets 40 are inserted into the first joint holes 34 of the upper side recessed portions 30 and into the second joint holes 36 of the first reinforcements 14, and the upper panel 18 and the first reinforcements 14 are joined together by caulking the caulking portions 46 of the rivets 40.

The rivets 40 are inserted inside the first joint holes 54 of the lower side recessed portions 50 and inside the second joint holes 56 of the first reinforcements 14, and the lower panel 20 and the first reinforcements 14 are also joined together by caulking the caulking portions 46 of the rivets 40.

Note that the strength of peripheral edge portions of the first joint holes 34 (first joint holes 54) in the upper panel 18 (lower panel 20) configured by carbon fiber reinforced plastic (CFRP) tends to be relatively low. Namely, the first joint holes 34 (first joint holes 54) are machined after molding the upper panel 18 (lower panel 20), and so reinforcing fibers (carbon fibers) adjacent to an inner peripheral face of the upper panel 18 are severed during machining. The peripheral edge portions of the first joint holes 34 (first joint holes 54) in the upper panel 18 (lower panel 20) thereby have reinforcing fibers (carbon fibers) with a shorter fiber length than other portions of the upper panel 18. Thus, the strength of the peripheral edge portions of the first joint holes 34 (first joint holes 54) in the upper panel 18 (lower panel 20) tends to be relatively low.

Note that the head portions 44 of the rivets 40 are disposed inside the upper side recessed portions 30 (lower side recessed portions 50) of the upper panel 18 (lower panel 20), and the diameter dimension of the head portions 44 is set larger than the diameter dimension of the caulking portions 46 of the rivets 40. Namely, a contact surface area between the head portions 44 of the rivets 40 and the seat portions 32 of the upper panel 18 (seat portions 52 of the lower panel 20) is greater than a contact surface area between the caulking portions 46 of the rivets 40 and the apex walls 14A of the first reinforcements 14. This enables the contact surface area between the rivets 40 and the upper panel 18 (lower panel 20) to be larger than in cases in which the caulking portions 46 are disposed at the upper panel 18 (lower panel 20) side. Thus, if load in a direction in which the upper panel 18 (lower panel 20) and the first reinforcements 14 come apart has acted the upper panel 18 (lower panel 20), for example, the peripheral edge portions of the first joint holes 34 (first joint holes 54) in the upper panel 18 (lower panel 20) can be supported over a large surface area by the head portions 44 of the rivets 40. The peripheral edge portions of the first joint holes 34 (first joint holes 54) in the upper panel 18 (lower panel 20) are thereby suppressed from breaking and the like. This enables the joint strength of the upper panel 18 (lower panel 20) joined to the first reinforcements 14 by the rivets 40 to be secured.

The upper side recessed portions 30 (lower side recessed portions 50) are formed in recessed shapes projecting out from the general portion 18A (general portion 20A) of the upper panel 18 (lower panel 20) toward the first reinforcement 14 side, and the seat portions 32 (seat portions 52) abut the first reinforcements 14. The joining force of the rivets 40 is borne by the seat portions 32 (seat portions 52) and the apex walls 14A of the first reinforcements 14, thereby enabling the distance between the general portion 18A (general portion 20A) of the upper panel 18 (the lower panel 20) and the first reinforcements 14 to be suppressed from changing. This enables the adhesive strength of the adhesive 60 with respect to the upper panel 18 (lower panel 20) and the first reinforcements 14 to be stabilized when joining the upper panel 18 (lower panel 20) and the first reinforcements 14 together using the rivets 40 and the adhesive 60.

Explanation follows regarding this point, using a comparative example of a hypothetical case in which the upper side recessed portions 30 (lower side recessed portions 50) and the general portion 18A (general portion 20A) of the upper panel 18 (lower panel 20) have been disposed flush with each other. In the comparative example, since the upper side recessed portions 30 (lower side recessed portions 50) and the general portion 18A (general portion 20A) are formed flush with each other, the adhesive 60 is also applied to peripheral portions of the first joint holes 34 (first joint holes 54). Thus, in the comparative example, when the respective members are joined together by the rivets 40 prior to the adhesive 60 hardening, the adhesive 60 is squeezed out at peripheral portions of the rivets 40 by the joining force of the rivets 40. Thus, the adhesive 60 is hardened in a state in which the gap between the upper panel 18 (lower panel 20) and the first reinforcements 14 at the peripheral portions of the rivets 40 has narrowed. The adhesive strength of the adhesive 60 with respect to the upper panel 18 (lower panel 20) and the first reinforcements 14 therefore becomes unstable. Note that in the comparative example, in cases in which the respective members are joined together by the rivets 40 after the adhesive 60 has hardened, adhesive 60 that has oozed into the first joint holes 34 (first joint holes 54) needs to be removed. If the adhesive 60 is applied so that the adhesive 60 does not ooze into the first joint holes 34 (first joint holes 54), cases arise in which the adhesive 60 is not applied to the peripheral portions of the first joint holes 34 (first joint holes 54).

In contrast thereto, in the present exemplary embodiment as described above, the upper side recessed portions 30 (lower side recessed portions 50) project out from the general portion 18A (general portion 20A) of the upper panel 18 (lower panel 20) toward the first reinforcement 14 side, and the seat portions 32 (seat portions 52) abut the first reinforcements 14. This enables the distance between the general portion 18A (general portion 20A) of the upper panel 18 (lower panel 20) and the first reinforcements 14 to be suppressed from changing. The adhesive 60 is thereby suppressed from being squeezed out between the general portion 18A (general portion 20A) and the first reinforcements 14, even if the upper panel 18 (lower panel 20) and the first reinforcements 14 are joined together by the rivets 40 prior to the adhesive 60 hardening. This enables the adhesive strength of the adhesive 60 with respect to the upper panel 18 (lower panel 20) and the first reinforcements 14 to be stabilized in cases in which the upper panel 18 (lower panel 20) and the first reinforcements 14 are joined together by the rivets 40 and the adhesive 60.

The battery frame 10 is disposed under the floor of the vehicle. In the battery frame 10, the lower panel 20 is disposed at the vehicle lower side of the battery frame RF 12, and the head portions 44 of the rivets 40 are disposed further toward the vehicle upper side than the lower face of the general portion 20A of the lower panel 20. Thus, in a case in which an obstacle has approached the battery frame 10 from the lower side of the vehicle, for example, the obstacle is suppressed from striking (the head portions 44 of) the rivets 40 due to the obstacle striking the general portion 20A of the lower panel 20. This enables performance to protect the rivets 40 that join the lower panel 20 and the battery frame RF 12 together to be improved.

As described above, the first joint holes 34 (first joint holes 54) are machined after molding the upper panel 18 (lower panel 20). Thus, the joint strength of the upper panel 18 (lower panel 20) can be secured, even in cases in which the first joint holes 34 (first joint holes 54), through which the rivets 40 are inserted, are machined after molding the upper panel 18 (lower panel 20).

Note that in the present exemplary embodiment, the upper side recessed portions 30 are open toward the vehicle width direction outsides in plan view; however, the shape of the upper side recessed portions 30 may be set as desired. For example, the upper side recessed portions 30 may be formed in a circular shape in plan view similarly to the lower side recessed portions 50, or may be formed in a rectangular shape in plan view.

In the present exemplary embodiment, the lower side recessed portions 50 are each formed in a circular shape in plan view; however, the shape of the lower side recessed portions 50 may be set as desired. For example, the lower side recessed portions 50 may each be formed in a rectangular shape in plan view.

In the present exemplary embodiment, the first reinforcements 14 and the second reinforcements 16 of the battery frame RF 12 are each formed in a hat shape open toward the vehicle lower side; however, for example, the first reinforcements 14 and the second reinforcements 16 may each be formed with a rectangular shaped closed cross-section. In such a case, the lower panel 20 is joined to bottom walls of the first reinforcements 14 and the second reinforcements 16 by the rivets 40.

The invention claimed is:

1. A heterogeneous material joint structure comprising:
    a resin panel that is configured by a fiber reinforced plastic and that is formed with a plurality of first holes in a row along a vehicle front-rear direction at either vehicle width direction side portion of the resin panel;
    a metal panel that is configured by a metal and that includes a left and right pair of first reinforcements that extend along the vehicle front-rear direction and are formed with a plurality of second holes at locations facing the first holes, and a second reinforcement that extends along the vehicle width direction between the first reinforcements and has both vehicle width direction end portions joined to the first reinforcements; and
    rivets that are inserted into the first holes and into the second holes, that join the resin panel and the metal panel together in a state in which a head portion configuring one end portion of each of the rivets is disposed at the resin panel side and a flange portion configuring another end portion of each of the rivets is disposed at the metal panel side, a diameter dimension of the head portion being set larger than a diameter dimension of the flange portion, wherein:
    recessed portions that project out from a general portion of the resin panel toward the metal panel side and abut the metal panel are formed in the resin panel;
    the first holes are formed in the respective recessed portions; and
    the head portion of each of the rivets is closer to the metal panel than a surface of the general portion of the panel that is farther away from the metal panel.

2. The heterogeneous material joint structure of claim 1, wherein:
    the resin panel and the metal panel configure a frame that is disposed under a floor of a vehicle and that supports a vehicle installed component installed to the vehicle;
    in the frame, the resin panel is disposed facing a vehicle lower side of the metal panel; and
    the head portion is disposed further toward a vehicle upper side than the general portion.

3. The heterogeneous material joint structure of claim 1, wherein the first holes are machined after molding the resin panel.

4. The heterogeneous material joint structure of claim 1, wherein:
    the resin panel is respectively provided at each of a vehicle upper side and a vehicle lower side of the metal panel;
    the first reinforcements are each formed with a hat shaped cross-section as viewed from a length direction;
    an apex wall configuring an upper end portion of each of the first reinforcements is joined to the resin panel at the vehicle upper side of the metal panel;
    a flange configuring a lower end portion of each of the first reinforcements is joined to the resin panel at the vehicle lower side of the metal panel.

5. The heterogeneous material joint structure of claim 1, wherein the fiber reinforced plastic is carbon fiber reinforced plastic.

* * * * *